(12) United States Patent
Audart-Noel et al.

(10) Patent No.: US 7,942,580 B2
(45) Date of Patent: May 17, 2011

(54) REAR SUSPENSION FOR AN AIRCRAFT ENGINE WITH SHACKLE IN WAITING AND SPRING FOR SUCH A HINGE PIN IN WAITING

(75) Inventors: Virginie Audart-Noel, Pujaudran (FR); Stephane Levert, Toulouse (FR)

(73) Assignee: Airbus France, Toulouse (FR)

( * ) Notice: Subject to any disclaimer, the term of this patent is extended or adjusted under 35 U.S.C. 154(b) by 51 days.

(21) Appl. No.: 11/608,971

(22) Filed: Dec. 11, 2006

(65) Prior Publication Data

US 2007/0138337 A1    Jun. 21, 2007

(30) Foreign Application Priority Data

Dec. 15, 2005   (FR) .................................... 05 53896

(51) Int. Cl.
*F16C 27/00* (2006.01)
(52) U.S. Cl. .................... 384/222; 384/215; 244/54
(58) Field of Classification Search ............... 244/1 N, 244/53 R, 54; 267/167, 163, 140.12; 248/554–557, 248/560, 579, 603, 618, 622, 635, 500, 276.1, 248/284.1; 403/203, 371, 366; 384/535, 384/280, 99, 192, 202, 215, 222
See application file for complete search history.

(56) References Cited

U.S. PATENT DOCUMENTS

| | | | | |
|---|---|---|---|---|
| 3,829,184 A | * | 8/1974 | Chevret ........................ | 384/280 |
| 4,129,394 A | * | 12/1978 | Eichinger et al. .............. | 403/57 |
| 4,313,331 A | * | 2/1982 | Mode ............................ | 72/368 |
| 4,682,900 A | * | 7/1987 | Gu ................................ | 384/105 |
| 4,997,145 A | * | 3/1991 | Hodgkinson ................... | 244/54 |
| 5,601,370 A | * | 2/1997 | Shibayama et al. ........... | 384/215 |
| 6,189,830 B1 | * | 2/2001 | Schnelz et al. ................. | 244/54 |
| 6,330,995 B1 | | 12/2001 | Mangeiga et al. | |
| D517,900 S | * | 3/2006 | Goldenberg et al. .......... | D8/354 |

FOREIGN PATENT DOCUMENTS

| | | |
|---|---|---|
| DE | 27 58 741 | 7/1979 |
| DE | 40 10 466 A 1 | 10/1991 |
| DE | 195 08 418 A 1 | 9/1996 |
| EP | 1 129 942 A2 | 9/2001 |
| FR | 2 887 853 | 1/2007 |
| GB | 366582 | 1/1923 |

OTHER PUBLICATIONS

English Translation of DE366582.*
U.S. Appl. No. 12/067,298, filed Mar. 19, 2008, Audart-Noel, et al.

* cited by examiner

*Primary Examiner* — Timothy D Collins
*Assistant Examiner* — Brian M O'Hara
(74) *Attorney, Agent, or Firm* — Oblon, Spivak, McClelland, Maier & Neustadt, L.L.P.

(57) ABSTRACT

A rear suspension (10) for an aircraft engine assembly comprises a structure comprising two three-point shackles (12, 12') and one two-point shackle (14). One of the hinge pins in waiting on the two-point shackle (14), preferably the hinge pin (26) fixed to the engine yoke joint, is mounted with clearance and with a damping ring acting as a spring to prevent vibrations of the engines as long as the hinge pin (26) is not engaged. Each of the suspension connecting pins (10) is a ball joint connection, the beam (16) of the suspension (10) being provided with five aligned orifices (24, 24a, 28, 24', 24a').

15 Claims, 4 Drawing Sheets

REAR SUSPENSION FOR AN AIRCRAFT ENGINE WITH SHACKLE IN WAITING AND SPRING FOR SUCH A HINGE PIN IN WAITING

TECHNICAL FIELD

This invention generally relates to suspension of an aircraft engine to an suspension pylon, also called EMS (Engine Mounting Structure), for example used to suspend a turbojet below the aircraft wing, or to mount the turbojet above the wing.

More particularly, the invention relates to a new engine rear suspension including three shackles in which the general configuration can increase the reliability, particularly in the long term.

The invention also relates to a damping ancillary for such a suspension, so as to prevent any strain or any damage to the hinge pins in waiting on the shackles that perform <<Fail Safe>> functions.

STATE OF PRIOR ART

A suspension pylon is provided to form a connecting interface between an engine such as a turbojet and the aircraft wing. It transmits forces generated by its turbojet to the structure of the aircraft, and it also enables routing of fuel, air, electrical and hydraulic, . . . systems between the engine and the aircraft.

Thus, as illustrated in FIG. 1, an engine assembly 1 for an aircraft is designed to be fixed under a wing 2 of the aircraft and comprises an engine such as a turbojet 3 extending along an axis AA, and comprising the fan casing 4 at the forward end that delimits an annular fan duct, then the casing of the turbojet core and the ejection casing.

Throughout the following description, by convention, the terms "front" and "rear" refer to a forward direction of the aircraft as a result of thrust applied by the turbojet 3, this direction being diagrammatically shown by the arrow 5. For guidance, note that the assembly 1 is designed to be surrounded by a pod (not shown).

The engine assembly 1 also comprises a suspension pylon 6, a longitudinal element extending along a principal direction parallel to the AA axis, or slightly inclined from it. In order to transmit forces, the pylon 6 normally comprises a rigid structure often of the "box" type, in other words comprising edges composed of elements in the form of bars and connected by panels.

The rigid pylon structure 6 supports a mounting system 7, 8, 9 that fixes the turbojet 3 to it; this system comprises at least two engine suspensions, usually at least one front suspension 7 and at least one rear suspension 8; furthermore, the mounting system comprises a thrust resistance device 9 to resist thrust generated by the turbojet 3, for example in the form of two lateral rods connected firstly to a rear part of the fan casing 4 of the turbojet 3, and secondly to an suspension point located between the front suspension 7 and the rear suspension 8. Another system of suspensions (not shown) allows to ensure the hanging of this assembly 1 under the wing 2 of the aircraft.

Conventionally, the rear suspension 8 of the engine allows particularly to resist lateral, vertical and torsion displacements of the engine 3; furthermore, safety conditions impose fastening redundancies; in "Fail safe" engine suspension devices, the usual procedure is to include safety hinge pins that do not resist forces under normal operating conditions. Thus, a rear suspension comprises a suspension beam and two three-point shackles and one two-point shackle; for example see document U.S. Pat. No. 6,330,995.

However, it is found that the design of the connecting hinge pins used in existing suspensions is complex, and they do not solve problems inherent to putting them in waiting; there can be a diametric clearance between the shaft and its housing, and therefore some parts may be free to vibrate in the engine environment.

PRESENTATION OF THE INVENTION

Among other advantages, the invention is intended to overcome the disadvantages mentioned above of existing engine suspensions onto an aircraft suspension pylon, and particularly to provide a system for damping vibrations in a connection with clearance.

According to one of its aspects, the invention thus proposes an engine suspension comprising a first device or beam designed to be fixed to the suspension pylon and two three-point shackles, in other words triangular fittings associated with a linear shackle. The beam comprises a yoke joint provided with two U-shaped branches between which each shackle can be inserted. Each branch of the yoke joint comprises five anchor orifices facing each other, if possible aligned with each other corresponding to two orifices of each triangular shackle and one orifice of the linear shackle; each shackle also comprises a first anchor orifice designed to be fixed to a yoke joint on the engine side. The invention also relates to an engine assembly mounted using such an suspension.

The engine suspension mounting includes the use of connecting pins, preferably ball joints, so as to fix the three shackles through the five anchor points on the beam, and to fix the engine suspension to a yoke joint on the engine. At least two connecting pins, one on the linear shackle and the other on a three-point shackle at the beam, are mounted with clearance such that the corresponding anchor points are in waiting. At least one of the hinge pins in waiting is installed with clearance on the linear shackle and is provided with a vibration damping system; preferably, its clearance is larger than the clearance at the three-point shackle.

According to another aspect, the invention relates to a damping element designed to be used on a hinge pin in waiting installed with clearance. The damping element is in the form of a cylindrical ring, preferably split longitudinally, for example made from a 0.5 mm thick steel plate. The ring comprises longitudinal cut-outs in the form of strips, advantageously four, fixed at one end of the wall of the ring and free at the other end. The strips preferably project inwards into the ring and thus form an inscribed cylinder preferably parallel to the main ring over a non-zero length and at a distance from the free end of the strips; the strips are bent such that, regardless of the radial force applied to them, they are tangent to the inscribed cylinder and to the ring, such that no discontinuous force is transmitted.

BRIEF DESCRIPTION OF THE DRAWINGS

The characteristics and advantages of the invention will be better understood after reading the following description with reference to the appended drawings, given for illustration purposes and in no way limitative.

DETAILED PRESENTATION OF PARTICULAR EMBODIMENTS

The rear suspension according to the invention is fixed by three points onto the pylon and two points onto the engine so as to resist vertical, lateral and torsion forces from the engine; the design of the suspension according to the invention is preferably symmetrical. Furthermore, the "Fail Safe" properties of the engine suspension are such that a failure in one of the suspension elements is compensated by the presence of another element. The essential function of the pylon in operation of the aircraft imposes strict reliability criteria. In particular, according to the design of the invention, failures of the yoke joint, hinge pins and shackles are compensated by the engagement of a hinge pin in waiting, and forces are transferred in a very "clean manner" between the shackles.

Figure 1:
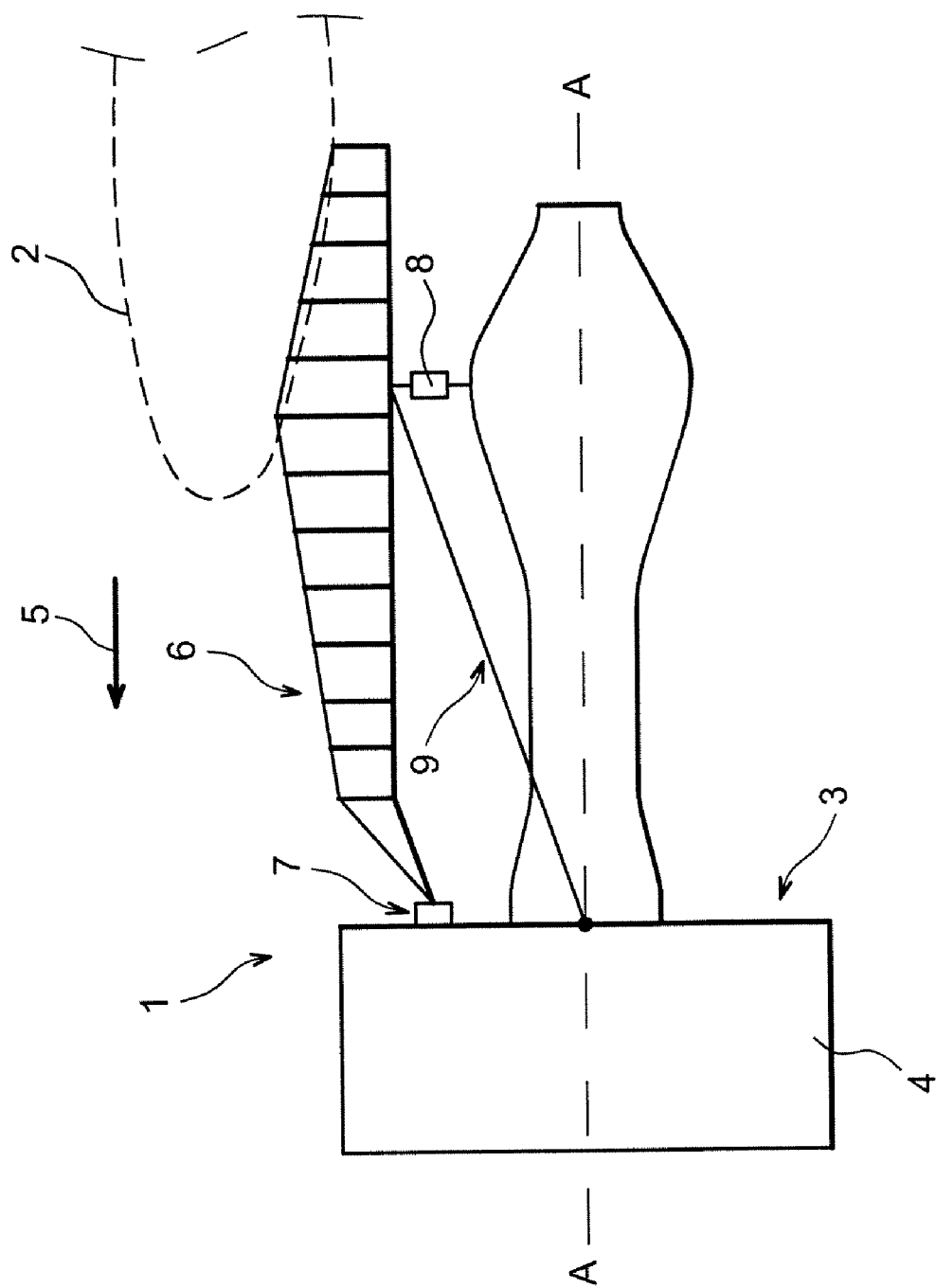
FIG. 1, already described, shows a lateral diagrammatic view of a partial engine assembly for an aircraft.
Figure 2A:
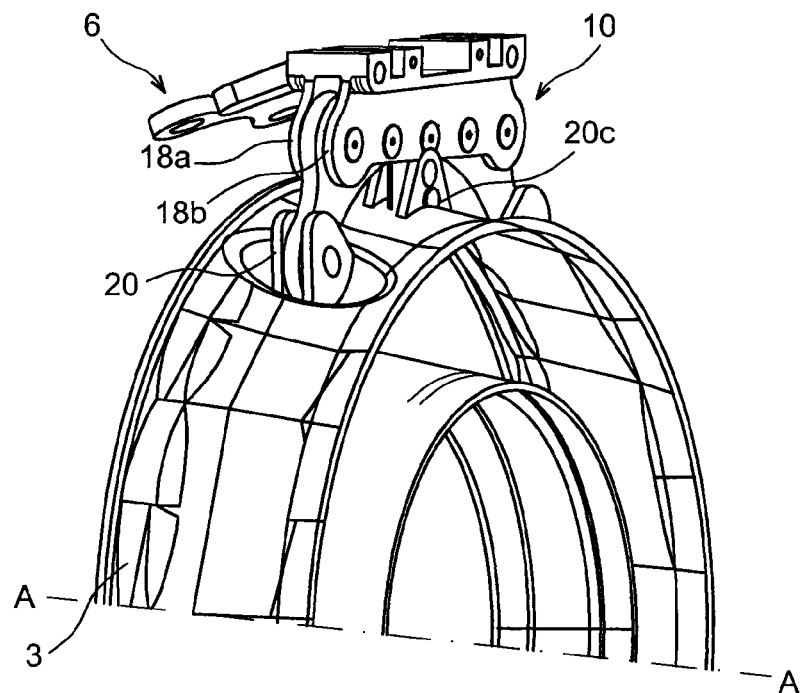
FIG. 2A shows an engine assembly mounted through an suspension according to the invention and an suspension according to a preferred embodiment shown in FIG. 2B.
Figure 2B:
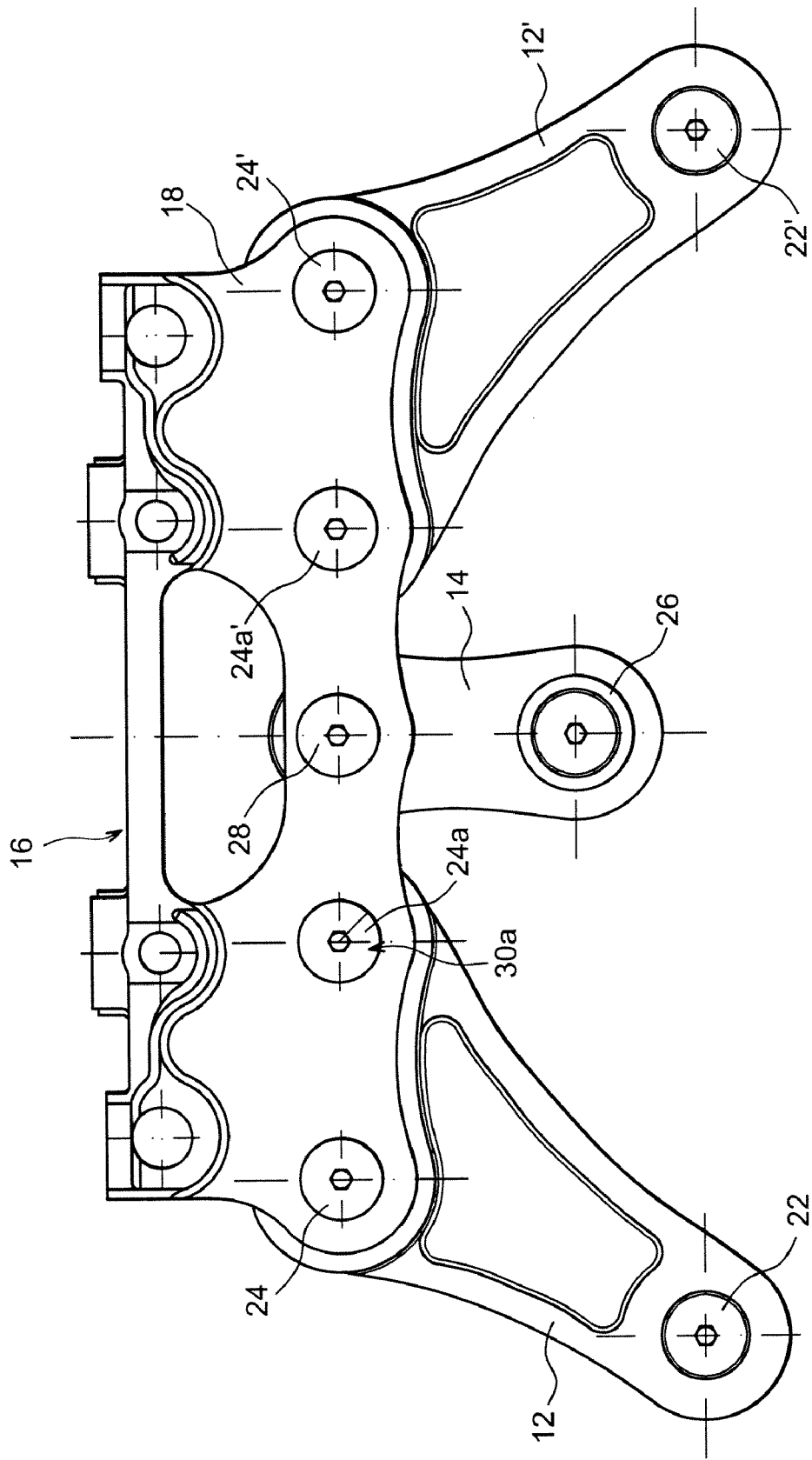

As shown in FIGS. 2A and 2B, the suspension 10 according to the invention is of the "double boomerangs" type and is orthogonal or quasi-orthogonal to the AA axis of the engine 3, in other words it comprises two approximately triangular fittings 12, 12' or three-point shackle defining a radial mounting plane approximately normal to the AA axis. Each of the shackles 12, 12' enables suspension at one point on the engine side 3 and at two points at the pylon side 6, one of the four anchor points on the pylon side 6 not being stressed under normal operation but making it possible to compensate for a failure in one of the other three points. Preferably, the shape and nature of two shackles 12, 12' are similar, and are symmetrical about a plane normal to the mounting plane and containing the AA axis of the engine 3.

Furthermore, a third approximately linear fitting 14, or two-point shackle is also provided; this shackle 14 comprises an anchor point on the pylon side 6 and an anchor point on the engine side 3, but is not stressed under normal operation. On the other hand, it compensates for a failure at the anchor points at the engine end of the three-point shackles 12, 12', due to its complete engagement; in this case, the two-point shackle 14 replaces the defective three-point shackle 12' with transfer of forces from this defective shackle 12' to the other three-point shackle 12 and the two-point shackle 14.

The suspension according to the invention is made through a beam 16 fixed to the pylon 6 or forming an integral part of it, for assembly of the shackles 12, 12', 14. The beam 16 comprises a U-shape yoke joint 18 with two branches 18a, 18b between which the fittings 12, 12', 14 can be inserted for fixing purposes; preferably, the adjustment between the fittings 12, 12', 14 and the spacing between the branches 18a, 18b is determined by rotation of the shackles that have to remain free to accommodate axial displacements of the engine 3 (for example due to thermal expansion). In fact, the beam 16 has a normal design; in particular, its shape, dimensions and composition are adapted and modeled in a known manner as a function of the engine 3, the pylon 6 and the aircraft type.

At the other end, the shackles 12, 12', 14 are attached to yoke joints 20 fixed to the engine casing 3 or forming an integral part of it. In this case once again, the adjustment between the fittings 12, 12', 14 and the spacing between the branches of the yoke joints 20 is determined by the rotation of the shackles that must remain free to accommodate axial displacements of the engine 3.

Therefore, having seen the detailed configuration described above, each triangular shackle 12, 12' includes three orifices located at the three corners of each triangle; a first orifice 22 acts as an anchor to the engine 3, and two second orifices 24, 24a are fixed to the beam 16; the length of the first branch of the shackles 12, 12' between the first orifice 22, 22' and the second external orifice 24, 24' is adapted to the spacing between the engine 3 and the pylon 6. Furthermore, the linear shackle 14 comprises a first orifice 26 at a first end fixed to a central yoke joint 20c of the engine 3 and a second orifice 28 at the other end acting as an anchor to the beam 16; the separation distance is adapted to the spacing between the engine 3 at this level and pylon 6.

Thus, the beam 16 comprises five facing orifices for the second 24, 24a, 24', 24a', 28 anchor points of the shackles 12, 12', 14. Preferably, the five anchor orifices of the beam 16 are aligned so that the system is statically determinate; these five anchor orifices are preferably the only orifices present on the branches 18a, 18b. It is also advantageous if the spacing between the second anchor orifices 24, 24a in each three-point shackle 12 is identical to the length of their first arm [22-24], in other words if the three-point shackles 12, 12' are isosceles so as to better distribute the forces.

Figure 3:
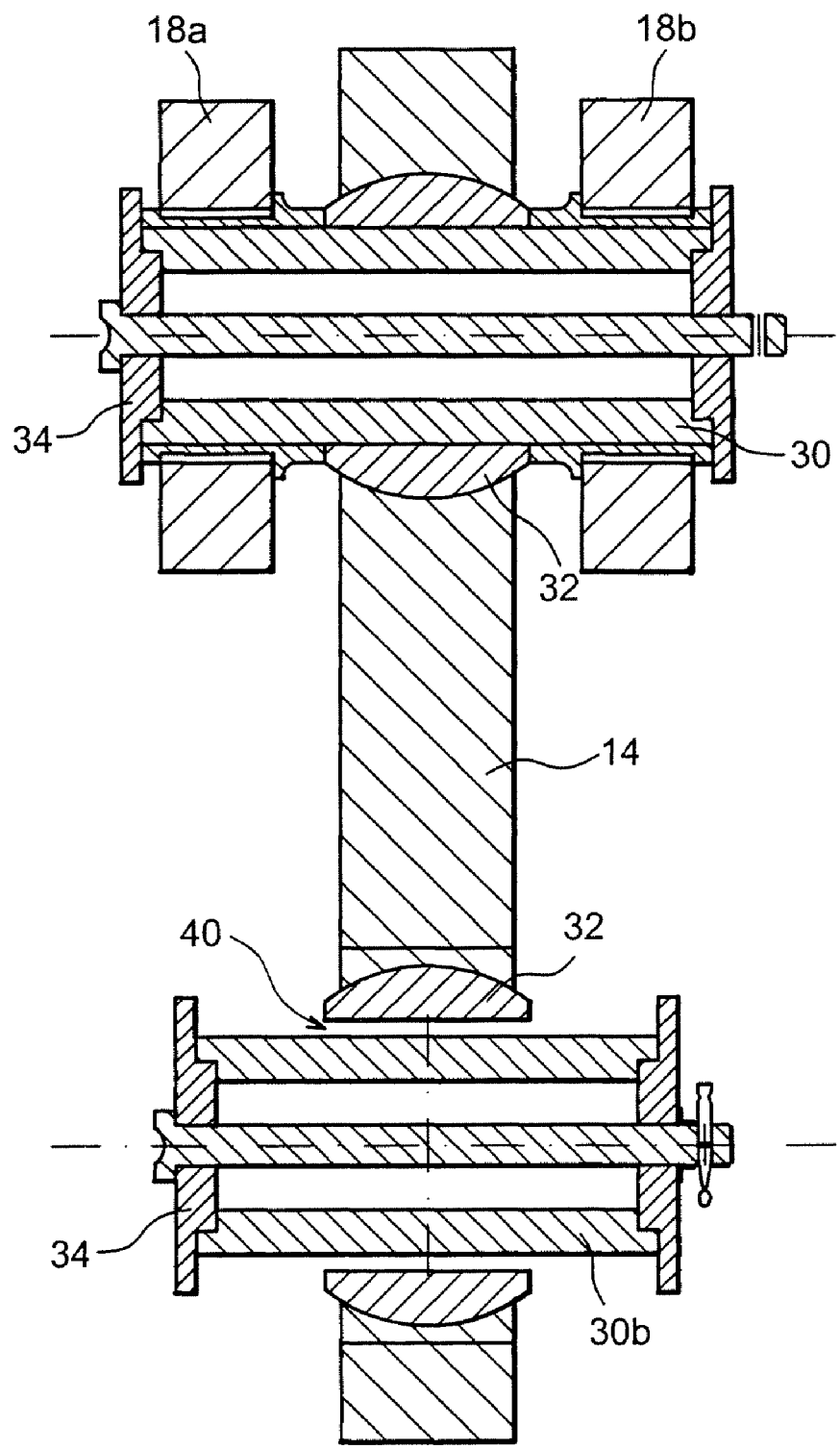
FIG. 3 diagrammatically shows suspension of the linear shackle of a fastener according to the invention.

Shackles 12, 12', 14 and yoke joints 18, 20 are fixed together using connecting pins 30, advantageously identical to each other in terms of their functions, although their dimensions are different. In particular, as illustrated in FIG. 3, the connecting pins 30 are coupled to a system 32 enabling a ball-joint type connection, and means 34 for blocking the hinge pin in the longitudinal position so as to prevent any damage and/or statically indeterminate positioning inherent to displacement along its axis, as for example described in application FR 05 51821.

During normal operation, the first shackle 12 and one of the arms of the second shackle 12' resist vertical, lateral and torsion forces from the engine 3, and their hinge pins 30 are adjusted to match the diameter of the orifices 24, 24', 24a'; one of the second orifices 24a and the two-point shackle 14 are not stressed and remain "in waiting", while the five other orifices resist the entire load (obviously the unstressed orifice could also be a first external orifice 24).

The orifice 24a in waiting on the three-point shackles is engaged in the case of a failure at the beam 16 of an suspension hinge pin 30, or of a branch of the yoke joint 18a, 18b, or more generally a yoke joint of the shackle 12; the orifices 26, 28 in the two-point shackle 14 are engaged in the case of a failure of one of the three-point shackles 12, 12', or a failure at the engine of an suspension pin 30 or a branch of a yoke joint 20. The hinge pins 30a, 30b corresponding to these orifices in waiting are mounted with clearance and are inactive during normal operation. This solution is easier to make and is more reliable than the existing solution that consists of sliding studs on the two-point shackle to resist the torque instead of the three-point shackles, which can introduce wear problems and blocking problems in service. Furthermore, the weight of such a sliding ball joint is significant and the coupling solution adopted according to the invention can achieve a weight saving that is always welcome in the aeronautical field.

Note that it is possible and even preferable to mount only one of the hinge pins 30b of the two-point shackle 14 with clearance and to adjust the other; the fact that one of the connections, preferably at the engine coupling, in other words for the first orifice 26, is installed with clearance is sufficient to ensure that the shackle 14 is not engaged, and the adjusted mounting of the other connection 30 at the second orifice 28 prevents any vibration between the hinge pin 30 and the shackle 14 even when the shackle is not engaged, the hinge pin in itself not being "in waiting".

Thus, two hinge pins 30a and 30b are mounted with clearance and are engaged one rearer the other as soon as one of the hinge pins 30 of the main shackles 12, 12' fails. The clearances are advantageously calculated such that the hinge pin 30a engages before the hinge pin 30b so as to always maintain a "3-point shackle+2-point shackle" configuration. Thus, in the case in which a hinge pin 30 fails at the beam 16, only the hinge pin 30a is engaged; in the case of the failure of a hinge pin 30 at the engine 3, the hinge pin 30b is engaged, and the hinge pin 30a is also possibly engaged (depending on whether or not the failure takes place on the shackle 12 comprising the hinge pin 30a in waiting). For example, the radial clearance is 4 mm for a hinge pin 30a and 5 mm for a hinge pin 30b (these hinge pins may have diameters of 42 mm and 38 mm respectively).

Thus, this configuration according to the invention covers a relatively long distance between the beam 16 and the yoke joints 20 of the engine casing 3 and introduces a vertical force only at the central yoke joint 20c. This aspect is particularly important considering problems encountered by engine manufacturers to resist a large tangential force at its central yoke joint 20c. Furthermore, differential displacements are absorbed by rotation of ball joints 32 and associated forces are thus minimised, considering that there is no axial sliding that could block or introduce large parasite forces. This minimisation also makes it possible to optimise the mass of the rear suspension 10.

The rear suspension according to the invention is such that two hinge pins in waiting (at orifices 24a and 26) or three (with an additional pin at the orifice 28) are mounted with clearance. However, the presence of a clearance may introduce problems at an engine assembly 1 due to vibrations generated by operation of the aircraft. In particular, the first orifice 26 of the two-point shackle 14 is highly stressed, and the relative movement of its connecting pin 30b is not compensated by being supported elsewhere; although it is installed with clearance, the hinge pin 30a in waiting does not vibrate since the other two connections (at the other two orifices 22, 24) of the shackle 12 are adjusted.

Figure 4:
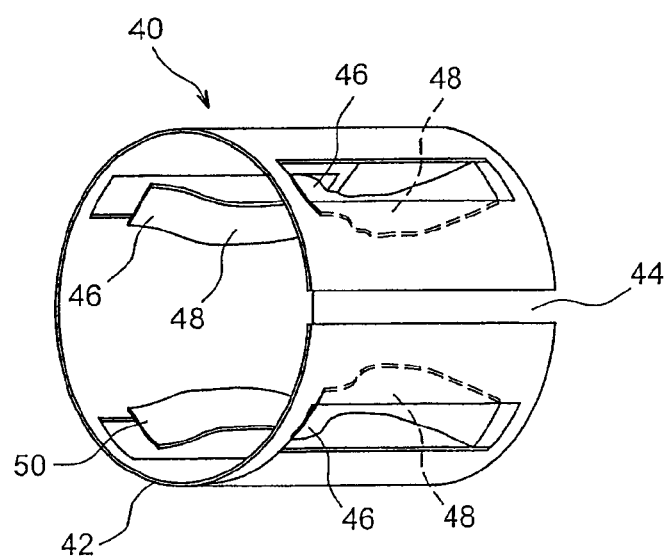
FIG. 4 shows a damping system according to one preferred embodiment of the invention.

To prevent any damage, the hinge pin 30b is provided with a damping ring 40 preventing vibrations of the engine 3 from being transmitted to the ball joint 32 and/or the shackle 12, the hinge pin 30b then being artificially blocked in an orifice with dimensions corresponding to its diameter; see FIG. 4. This damping of vibration phenomena at the elements in waiting was not previously envisaged in this form.

Preferably, the damping system 40 is made by means of a cylinder 42 of revolution derived from a plate wound around an arc of approximately 360°, advantageously provided with a longitudinal slot 44 to facilitate the housing. The cylinder 40 also comprises strips 46 derived from partial cutting of its wall 42, fixed to it at one end, free at the other end and bent either inwards or outwards so as to project from the main cylinder 42; preferably, the strips 46 are arranged to face inwards into the cylinder and form an inscribed cylinder with a diameter less than the ring 40. In order to optimise their function, the strips 46 coincide with the inscribed cylinder over a non-zero portion 48 of their length; in other words between their first free end and their second fixed end of the wall 42, each strip 46 comprises a first portion 48 parallel to the axis of the cylinder 40. Advantageously, to prevent any accidental damage to the parts 30b, 32 between which the ring 40 is mounted, the central portion 48 is at a distance from the free end of the strip 46 held in place by an end part 50 with non-zero length, such that the diameter of the circle defined by the free ends of each strip 46 is between the diameter of the wall 42 and the diameter of the inscribed cylinder 48. To facilitate assembly, the free end 50 of each strip 46 is arranged on the same side of the system 40.

The ring 40 is thus forced into contact with the ball joint 32 and preferably the outside diameter of the cylinder 42 is slightly greater than the inside diameter of the housing 32, the slot 44 enabling easy insertion despite this radial constraint in the rest position; the ring 40 also blocks the hinge pin 30b in the shackle 12 and compensates for the clearance formed with the ball joint 32, such that the diameter of the cylinder formed by the first portions 48 of the strips 46 is slightly less than the diameter of the hinge pin 30b to fix it into place.

In particular, if the clearance to be compensated is of the order of 5 mm, it is advantageous if each strip 46 forms a portion 48 projecting by about 6 mm towards the inside of the ring 40, such that even if the hinge pin 30b is in contact with the ball joint 32 over a directing line due to vibrations and/or displacement, the hinge pin 30b is blocked in the ball joint 32/shackle 12 assembly by a strip 46.

Advantageously, the ring 40 is provided with four strips 46 so as to eliminate all positioning stresses at assembly; three strips 46 could be used to compensate for the clearance in all directions but positioning would have to be adapted to stresses at rest, and five or more strips could generate sizing problems in the corresponding width of the strips 46 and the cylinder 42.

The width of the strips 46 and their length and particularly the length of the first portions 48 are determined by a compromise between the flexibility of the strips (facilitating compression and engagement) and good spring capacity (preventing any lateral displacement), and for example depend on the diameters concerned, the clearance to be compensated, the thickness and nature of the cylinder plate 42, etc.

Furthermore, it is preferable if there is no "shape anomaly" on the strips 46, in other words all direction changes (between cylinder 42, first portion 48 and end portion 50) are progressive, and all projecting angles are rounded, for example by tribe-finishing. In particular, regardless of the radial force applied on the first portion 48 of each strip 46, the part connecting the first portion 48 and the second end of the strip, and the part 50 between the first end and the first portion 48 are tangent to the contact points with the hinge pin 30b and the ball joint 32; the slopes are thus compatible with the chamfer of the hinge pin 30b.

The strips 46 are preferably cut out from a plate 42, for example a 0.5 mm thick plane spring steel, possibly with rejection of material during the cut so as to enable elongation of the strips 46 inherent to bending (for example for a 45 mm diameter and 39.8 mm thick element 40, the centered 31.8 mm long strips 46 are 6 mm wide and the corresponding recess in the plate is 8 mm wide). The strips are then bent according to a layout determined by CAD (Computer Assisted Design) to prevent any deterioration of the hinge pin 30b, particularly with progressive slopes (for example with angle 150°) between each of the two ends of the strip 46 and the first portion 48 (for example with a length of 9 mm), itself at a constant distance from the plate 42 (for example 4 mm towards the inside); finally, the plate 42 is rolled. It is possible to do the bending after the plate has been rolled.

Thus, due to the spring effect, the bent strips 46 prevent vibrational lateral movement by filling in the radial clearance between the ball joint 32 and the hinge pin 30b, so that vibration effects can be dampened. When the hinge pin 30b is engaged if necessary, the complete compression of the strips 46 assures a conventional cylinder/cylinder type bearing surface between the shaft 30b and its housing 32, and transmission of forces is allowed.

The damping element 40 is particularly suitable for a hinge pin in waiting subject to vibrations of the type of the hinge pin 30b in waiting on a two-point shackle 14 of a rear suspension of the engine 10 according to the invention. However, it can be used on any hinge pin in waiting and for example also at the other connection of the two-point shackle 14, that can thus be mounted in a non-adjusted manner, or at the hinge pin 30a in waiting on the three-point shackle 12, although this will increase the weight of the assembly. The ring 40 may also be used in a location other then the rear suspension.

Obviously, the dimensions are only given for guidance in one preferred embodiment, and must be interpreted with normal manufacturing tolerances.

The invention claimed is:

1. A damping element for radial clearance of a rotating hinge pin, the element comprising:
    a cylindrical wall of revolution along an axis, the wall being cut to form at least two longitudinal strips fixed to the wall at a first end and free from the wall at a second end part and extending from the first end to the second end part in a direction of the axis, each strip including a first plateau portion with a length of at least five percent of the strip between the two ends of the strip, each of the first plateau portions being substantially coaxial with the cylindrical wall, the plateau portions defining a second cylinder of constant diameter having a diameter smaller than a diameter of the cylindrical wall,
    wherein each of the first plateau portions are connected to the first end by a part forming a gradual slope between the first plateau portion and the wall.

2. The element according to claim 1, wherein the second end part of each strip has a non-zero length and is connected to the first plateau portion by a gradual slope between the first portion and the second end part.

3. The element according to claim 1, wherein the strips project inwards into the element.

4. The element according to claim 1, further comprising four identical strips.

5. The element according to claim 1, wherein the cylindrical wall is provided with a longitudinal slot enabling insertion into a housing despite a radial constraint in a rest position.

6. The element according to claim 1, wherein the cylindrical wall is a spring steel plate with a thickness of substantially 0.5 mm and an outside diameter of 45 mm, or 38±4 mm respectively, and in which each strip projects by 4 mm, or 6±1 mm respectively.

7. An engine suspension for an aircraft designed to be inserted between an engine and a suspension pylon of the engine, the suspension comprising:
    a first fastening device designed to be fixed to the pylon and provided with two branches each provided with five anchor orifices, wherein five anchor orifices of a first branch face five anchor orifices of a second branch,
    two shackles each comprising three orifices, a first orifice being designed to be fixed at an engine yoke joint and an other two orifices being designed to be connected to the first fastening device through the anchor orifices,
    a linear shackle comprising a first orifice designed to be fixed at an engine yoke joint and a second orifice designed to be connected to the first fastening device through an anchor orifice, and
    the damping element according to claim 1 configured to cooperate with the first or second orifice on the linear shackle.

8. The suspension according to claim 7, wherein the five orifices of each branch of the first device form a straight line.

9. The suspension according to claim 7, further comprising:
    eight connecting pins cooperating with the shackle orifices,
    a hinge pin mounted in one of the shackle orifices with a clearance between a triangular shackle and the first fastening device, and
    at least one additional hinge pin, that does not resist forces under normal operating conditions, cooperating with the damping element, and mounted with clearance at the linear shackle.

10. The suspension according to claim 9, wherein the clearance between the triangular shackle and the first fastening device is less than a clearance at the linear shackle.

11. The suspension according to claim 7, wherein the connecting pins are provided with ball joints.

12. An engine assembly for an aircraft, comprising:
    a suspension pylon, and an engine fixed to the pylon through the suspension according to claim 7 in a rear suspension.

13. The element according to claim 1, wherein the first plateau portion is a substantially planar portion.

14. The element according to claim 1, wherein the wall is cut to form at least two inwardly projecting longitudinal strips fixed to the wall at a first end and free from the wall at a second end part, the wall including cutout portions entirely within edges of a cylindrical side surface of the wall and provided adjacent to each of the at least two inwardly projecting longitudinal strips.

15. A damping element for radial clearance of a rotating hinge pin, the element comprising:
    a cylindrical wall of revolution along an axis, the wall being cut to form at least two longitudinal strips projecting within edges of a cylindrical side surface of the wall and fixed to the wall at a first end and free from the wall at a second end part, each strip including a first plateau portion with a length of at least five percent of the strip between the two ends of the strip, the first plateau portions being substantially coaxial with the cylindrical wall and together defining a second cylinder, with a diameter of the second cylinder being smaller than a diameter of the cylindrical wall, and
    each of the first plateau portions being connected to the first end by a part forming a gradual slope between the first plateau portion and the wall.

* * * * *